US009285768B2

(12) United States Patent
Borenstain et al.

(10) Patent No.: US 9,285,768 B2
(45) Date of Patent: Mar. 15, 2016

(54) APPARATUS, PRINTER AND METHOD FOR ELECTROSTATIC PRINTING

(75) Inventors: Shmuel Borenstain, Nes Ziona (IL); Sagi Daren, Nes Ziona (IL); Dror Kella, Nes Ziona (IL)

(73) Assignee: HEWLETT-PACKARD INDIGO B.V. (NL)

( * ) Notice: Subject to any disclaimer, the term of this patent is extended or adjusted under 35 U.S.C. 154(b) by 0 days.

(21) Appl. No.: 14/414,373

(22) PCT Filed: Jul. 13, 2012

(86) PCT No.: PCT/EP2012/063830
§ 371 (c)(1),
(2), (4) Date: Jan. 12, 2015

(87) PCT Pub. No.: WO2014/008950
PCT Pub. Date: Jan. 16, 2014

(65) Prior Publication Data
US 2015/0192895 A1 Jul. 9, 2015

(51) Int. Cl.
*G03G 21/20* (2006.01)
*G03G 15/16* (2006.01)
*G06F 17/30* (2006.01)

(52) U.S. Cl.
CPC ............ *G03G 21/203* (2013.01); *G03G 15/161* (2013.01); *G03G 15/168* (2013.01); *G06F 17/30286* (2013.01)

(58) Field of Classification Search
CPC .................................................. G03G 21/203
See application file for complete search history.

(56) References Cited

U.S. PATENT DOCUMENTS

| 5,481,339 | A | 1/1996 | De Cock et al. |
| 5,539,500 | A | 7/1996 | Hamamichi et al. |
| 6,192,203 | B1 | 2/2001 | Nishio et al. |
| 7,347,143 | B2 | 3/2008 | Shimizu |
| 2004/0170444 | A1 | 9/2004 | Yamada |
| 2005/0111873 | A1* | 5/2005 | Regan et al. .................... 399/94 |

(Continued)

FOREIGN PATENT DOCUMENTS

| JP | 55087177 A | 7/1980 |
| JP | 04349473 | 12/1992 |

(Continued)

OTHER PUBLICATIONS

Chen et al., Banding Artifact Reduction for a Class of Color Electrophotographic Printers with Underactuated Motor/gear Configuration, IEEE Transactions on Control Systems Technology, vol. 16, No. 4, Jul. 2008.

(Continued)

*Primary Examiner* — Sandra Brase
(74) *Attorney, Agent, or Firm* — Mannava & Kang, P.C.

(57) ABSTRACT

There is disclosed an apparatus which may comprise a transfer member and a photoconductor. The apparatus may be operable to apply a potential difference between the transfer member and the photoconductor and the photoconductor may be operable to transfer a layer of electrostatic printing material from the photoconductor to the transfer member at a transfer region under the action of the applied potential difference. According to the present disclosure, the apparatus may further comprise a humidity raising device which may be operable to raise the relative humidity of the transfer region above an ambient level. A printer and a method of facilitating transfer of electrostatic printing material are also disclosed.

14 Claims, 6 Drawing Sheets

(56) References Cited

U.S. PATENT DOCUMENTS

2007/0286633 A1 * 12/2007 Takuma et al. .............. 399/94
2011/0069987 A1    3/2011 Chang et al.

FOREIGN PATENT DOCUMENTS

| | | |
|---|---|---|
| JP | 06182960 A | 7/1994 |
| JP | 10052902 A | 2/1998 |
| JP | 2001175096 A | 6/2001 |
| JP | 2003058005 A | 2/2003 |

OTHER PUBLICATIONS

International Search Report and Written Opinion dated Feb. 8, 2013, issued on PCT Patent Application No. PCT/EP2012/063830 dated Jul. 13, 2012, European Patent Office.

* cited by examiner

APPARATUS, PRINTER AND METHOD FOR ELECTROSTATIC PRINTING

CLAIM FOR PRIORITY

The present application is a national stage filing under 35 U.S.C 371 of PCT application number PCT/EP2012/063830, having an international filing date of Jul. 13, 2012, the disclosure of which is hereby incorporated by reference in its entirety.

BACKGROUND

In printing technology, electrostatic ink materials may be used to form a printed image on a print medium. During such printing processes, a latent image is created on a photo conducting element and is developed into a full image by the selective attraction and repulsion of charged toner particles. The image thus created may then be transferred to at least one intermediate surface before being transferred to the print medium. The quality of image transfer from the photo conducting element to the intermediate surface has a significant impact upon final print quality, and image transfer is thus conducted under finely controlled working parameters.

BRIEF DESCRIPTION OF THE DRAWINGS

FIG. 3 is a graph showing image Fog against Intermediate Transfer Member voltage at different values of relative humidity for a test conducted on an example of an apparatus.

FIG. 4 is another graph showing image Fog against Intermediate Transfer Member voltage at different values of relative humidity for tests conducted on an example of an apparatus.

FIG. 5 is a graph showing image Fog against indentation for two different values of relative humidity for a test conducted on an example of an apparatus.

FIG. 6 is a graph showing image Fog against indentation at different values of relative humidity for tests conducted on an example of an apparatus.

DETAILED DESCRIPTION

Figure 1:
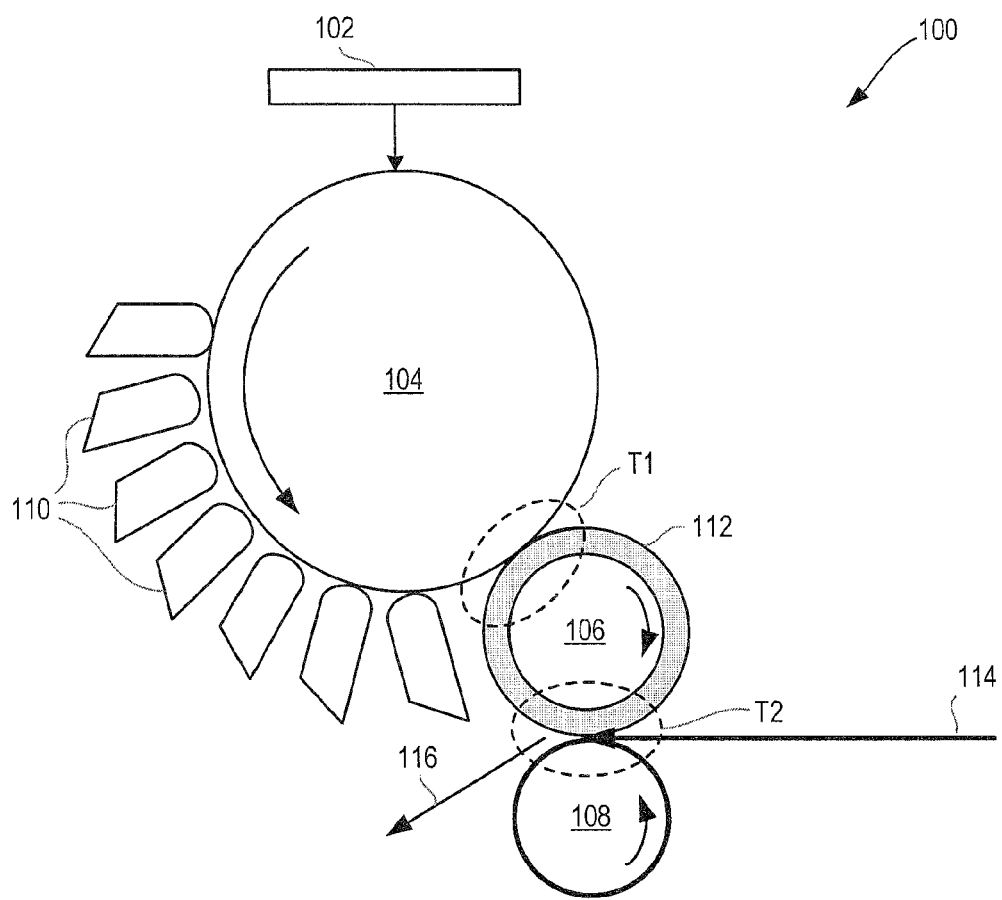
FIG. 1 is a partial schematic illustration of elements in an example of a Liquid Electro Photographic (LEP) printing apparatus.

Before examples of the present invention are disclosed and described, it is to be understood that the examples are not limited to the particular components, process steps and materials disclosed herein because such components, process steps and materials may vary somewhat. It is also to be understood that the terminology used herein is used for the purpose of describing particular examples only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, the term "about" is used to provide flexibility to a numerical range endpoint by providing that a given value may be a little above or a little below the endpoint. The degree of flexibility of this term can be dictated by the particular variable.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1% to about 5%" should be interpreted to include not only the explicitly recited values of about 1% to about 5%, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

In the subsequent description and appended claims, the term "ink" refers broadly to material deposited onto a surface by a printer or press. For example, the term "ink" includes liquid toners, dry toners, UV cured inks, thermally cured inks, inkjet inks, pigment inks, dye based inks, solutions without colorant, solvent based inks, water based inks, plastisols, or other appropriate solutions.

For the purposes of the subsequent description and appended claims, the term "relative humidity" $\phi$ is defined as the ratio of the partial pressure of water vapor (H$_2$O) ($e_w$) in the mixture to the saturated vapor pressure of water($e^*_w$) at a prescribed temperature. Relative humidity is expressed in the present disclosure as a percentage and is calculated by using the following equation:

$$\phi = \frac{e_w}{e^*_w} \times 100\%$$

Unless otherwise stated, any feature described herein can be combined with any aspect or any other feature described herein.

In one aspect of the present disclosure, there is provided an apparatus comprising a transfer member and a photoconductor. In some examples, the apparatus may be operable to apply a potential difference between the transfer member and the photoconductor, and the photoconductor may be operable to transfer a layer of electrostatic printing material from the photoconductor to the transfer member at a transfer region under the action of the applied potential difference. In some examples, the apparatus may further comprise a humidity raising device which may be operable to raise the relative humidity of the transfer region above an ambient level.

In another aspect of the present disclosure, there is provided a printer for printing on a print media, the printer comprising a photoconductor operable to receive electrostatic printing material according to a latent image formed on the photoconductor, and a transfer member operable to deliver the electrostatic printing material from the photoconductor to the print media. In some examples, the printer may be operable to apply a potential difference between the transfer member and the photoconductor to drive transfer of the electrostatic printing material from the photoconductor to the transfer member at a transfer region of the printer. In some examples, the printer may further comprise a humidity raising device operable to raise the relative humidity of the transfer region above an ambient level.

In another aspect of the present disclosure, there is provided a method of facilitating transfer of electrostatic printing material from a photoconductor to a transfer member, wherein the transfer is effected at a transfer region under the action of an applied potential difference. In some examples, the method comprises increasing the relative humidity of the transfer region above a threshold value.

In some examples, an apparatus according to the present disclosure may comprise a transfer member and a photoconductor, and the apparatus may be operable to apply a potential difference between the transfer member and the photoconductor. In some examples, the potential difference may be applied by the application of a voltage to the transfer member. In some examples, the photoconductor may be operable to transfer a layer of electrostatic printing material from the photoconductor to the transfer member at a transfer region under the action of the applied potential difference. In some examples, the apparatus may further comprise a humidity raising device which may be operable to raise the relative humidity of the transfer region above an ambient level.

In some examples, the humidity raising device may comprise a cooperating air pump and humidifier unit. According to an example, the humidity raising device may further comprise a conduit operable to deliver, under the action of the air pump, humid air output from the humidifier unit to the transfer region.

In some examples, the humidity raising device may be configured to raise the relative humidity of the transfer region above a threshold level of at least 30%. In some examples, the threshold level may be at least 50%.

In some examples, the potential difference may be less than or equal to 500V, or may be less than or equal to 450V, or may be less than or equal to 400V, or may be less than or equal to 350V, or may be less than or equal to 300V, or may be less than or equal to 250V.

In some examples, a printer for printing on a print media according to the present disclosure may comprise a photoconductor which may be operable to receive electrostatic printing material according to a latent image formed on the photoconductor, and a transfer member which may be operable to deliver the electrostatic printing material from the photoconductor to the print media. In some examples, the printer may be operable to apply a potential difference between the transfer member and the photoconductor to drive transfer of the electrostatic printing material from the photoconductor to the transfer member at a transfer region of the printer. In some examples, the printer may further comprise a humidity raising device which may be operable to raise the relative humidity of the transfer region above an ambient level.

In some examples, the potential difference may be applied by the application of a voltage to the transfer member.

In some examples, the humidity raising device may be located at an entrance to the transfer region. In some examples, a rotating action of the photoconductor and transfer member may act to entrain humid air into the transfer region.

In some examples, the humidity raising device may comprise a cooperating air pump and humidifier unit. According to an example, the humidity raising device may further comprise a conduit operable to deliver, under the action of the air pump, humid air output from the humidifier unit to the transfer region.

In some examples, the humidity raising device may be configured to raise the relative humidity of the transfer region above a threshold level of at least 30%. In some examples, the threshold level may be at least 50%.

In some examples, the potential difference may be less than or equal to 500V, or may be less than or equal to 450V, or may be less than or equal to 400V, or may be less than or equal to 350V, or may be less than or equal to 300V, or may be less than or equal to 250V.

In some examples, a method according to the present disclosure may facilitate transfer of electrostatic printing material from a photoconductor to a transfer member. In some examples, the transfer may be effected at a transfer region under the action of an applied potential difference. In some examples, the method may comprise increasing the relative humidity of the transfer region above a threshold value.

In some examples, the threshold value may be 30% relative humidity. In some examples, the threshold value may be 50% relative humidity. In some examples, the threshold value may be 75% relative humidity.

In some examples, increasing the relative humidity may comprise introducing increased humidity air to the transfer region.

In some examples, the potential difference may be less than or equal to 500V, or may be less than or equal to 450V, or may be less than or equal to 400V, or may be less than or equal to 350V, or may be less than or equal to 300V, or may be less than or equal to 250V.

The following examples illustrate a number of variations of the apparatus, printer, method and related aspects of the present disclosure. However, it is to be understood that the following are only illustrative of the application of the principles of the apparatus, printer, method and related aspects. Numerous modifications and alternatives may be devised without departing from the spirit and scope of the apparatus, printer, method and related aspects. The appended claims are intended to cover such modifications and arrangements.

Thus, while the apparatus, printer, method and related aspects have been described above, the following examples provide further detail in connection with what are presently deemed to be acceptable manners in which the apparatus, printer, method and related aspects may be realised.

The following description provides illustrative examples of the present disclosure in connection with an LEP printing process. However, such examples are for illustrative purposes only, and are not intended to limit in any way the scope of the present disclosure. The present disclosure may be realised in connection with other printing processes than the LEP printing process described below.

Referring to FIG. 1, an example of a digital Liquid Electro Photographic (LEP) printing system 100 comprises a writing head 102, a photoconducting cylinder, referred to as a photo imaging plate, or PIP 104, an intermediate transfer member (ITM) 106 and a supporting cylinder 108. A plurality of binary ink developer (BID) units 110 are arranged adjacent the PIP 104. The ITM 106 is encased by a resilient blanket 112, which is described in further detail below.

In the context of the LEP printing system 100 described, the term "nip" refers to a region between two cylinders where the cylinders are in closest proximity. If a print medium or other sheet material passes through a nip, for example between the ITM 106 and supporting cylinder 108 the distance between the two cylinders can be adjusted to produce differing levels of pressure on the print medium.

In use, the writing head 102 generates an electrostatic charge pattern on the PIP 104 representing the image to be printed. This latent image is then developed by the addition of ink from the binary ink developers 110, with a dedicated BID unit 110 being provided for each colour of ink desired. As each BID unit is engaged, it presents a uniform film of ink to the PIP 104. The ink from the BID units contains electrically charged ink particles which are repelled from the uncharged areas of the PIP 104 and attracted to those areas containing static charge, thus forming a deposited ink image on the PIP 104. As the PIP 104 rotates in the direction indicated on FIG. 1 by an arrow, the deposited ink image is transferred at a first transfer region T1 onto the blanket 112 surrounding the ITM 106. The image is then further transferred from the blanket 112 to a print medium at a second transfer region T2. The print medium enters the system as indicated at arrow 114, is supported by the supporting cylinder 108 as the image is transferred, and exits at arrow 116. For a colour image, the print medium is temporarily retained on the supporting cylinder 108, making multiple contacts with the ITM 106 and receiving a different layer of colour with each contact. In accordance with the present disclosure, the humidity of the first transfer region T1 is raised by the presence of a humidity raising device, which is discussed in further detail below.

Ink transfer between the PIP 104 and ITM 106 at the first transfer region T1 is driven by electrophoresis of the electrically charged ink particles, and is tuned by an applied mechanical load between the PIP and ITM cylinders. The electric field that drives the ink transfer is created by an applied bias voltage referred to as the ITM or blanket voltage, and the value of this voltage has a significant impact on image transfer quality. A further factor in determining image transfer quality is the mechanical load exerted by the PIP 104 on the blanket 112 of the ITM 106 and the ink contained between them. This load causes indentation of the PIP 104 into the ITM blanket 112 and is referred to as the indentation load of the PIP 104 on the blanket 112. The quality of image transfer at the first transfer region, dictated by the ITM bias voltage and the indentation, is a significant element in overall printed image quality. Final image quality is measured as the degree of granularity, or Fog, in images that have full ink coverage. Fog is measured on a 100% black ink coverage printout and is evaluated as the s.t.d of grey level in a 225 max scale.

Up to a certain level, print quality improves with increasing ITM bias voltage. However, over a certain threshold, increasing ITM bias ceases to contribute to improved print quality, and in some circumstances it is not possible to achieve acceptable print quality using ITM bias alone. To achieve images of a desired quality, increased indentation may also be used. Experimentation with ITM bias voltage and indentation load values permits the establishment of working point (WP) values of ITM bias voltage and indentation that give rise to final images of the desired quality. Such values may be established for the various different processes to be conducted on the LEP printing system 100 and on similar systems conducting electrostatic printing processes substantially as described above.

The present inventors have found that introducing a humidity raising device, and so raising the humidity of the transfer region between a photoconductor and a transfer member, facilitates transfer of electrostatic printing material under the action of an applied bias voltage, and thus enables the use of a lower bias voltage while maintaining the quality of material transfer. The humidity raising device thus permits adjustment of working point values of ITM bias voltage, and of indentation, to be lower than would otherwise be needed without the presence of the humidity raising device. In particular, the present inventors have discovered that the presence of a humidity raising device to raise humidity in the transfer region allows use of an ITM bias voltage that is below the corona breakdown threshold.

Previously, in order to achieve acceptable image transfer, a working point ITM bias voltage has been employed that is above the threshold value for corona breakdown through the air at the ITM-PIP nip region. The mechanism of this corona breakdown has been found to require a threshold bias voltage that is below the typical minimum value desired to achieve acceptable image transfer at the first transfer region of an electrostatic printing system. For example, the threshold corona breakdown voltage may be of the order of about 450V between dielectric materials such as the PIP and ITM blanket. In contrast, a minimum value of about 500V may be desired to achieve acceptable image transfer at the first transfer region. Consequently, corona breakdown has been unavoidable during the printing process, having detrimental effects upon the printing apparatus.

The ozone created by corona breakdown, as well as impact of corona particles on the ITM blanket, can cause damage to the top layer, referred to as the release layer, of the ITM blanket. Observation and measurements have shown that during corona breakdown, corona intensity, that is the electric current through the air, is higher in the background area where no ink is transferred than in the image area where ink is transferred. The threshold voltage for corona breakdown may be lower in the background area, and may for example be of the order of 300V with a threshold for print quality of 350V. The damage caused to the blanket by the corona may therefore be greater in the background, non image areas of the ITM blanket than in the image areas. This preferential damage can create shadows, called memories, of a previous image during printing of a new image. In certain circumstances, such shadows or memories may be undesirable and may constitute a statistically significant cause of blanket replacement, and hence reduced blanket lifespan. By enabling acceptable image transfer at reduced ITM bias voltage values, the apparatus, printer and method of the present disclosure reduce the occurrence of ITM blanket memories and so increase blanket lifespan, reducing the cost per page of the printing process.

The present inventors have also found that the apparatus, printer and method of the present disclosure reduce the deterioration of the PIP by reducing the rate of increase of the V-Light on the PIP through increasing the humidity of the first transfer region. It has been found that a residual electrical voltage (V-Light) can remain on the PIP after many printing impressions, increasing with increasing age of the PIP. Such residual voltage can limit the capacity of the Binary Ink Developers to develop the latent image on the PIP with ink, thus impacting upon the useful lifespan of the PIP. By reducing the rate of increase of the V-Light, the apparatus, printer and method of the present disclosure may therefore increase the lifespan of the PIP.

The present inventors have also found that the apparatus, printer and method of the present disclosure reduce conductivity of the charge roller which projects charge onto the PIP. The increased humidity reduces conductivity, meaning less energy is deposited on the charge roller and so providing better charging efficiency and longer lifespan of the charge roller.

The present inventors have also found the apparatus, printer and method of the present disclosure may assist in maintaining desired colour consistency. A correlation had been found between decline in colour consistency and low humidity. The increased humidity provided according to the present disclosure may address this decline.

Further examples of the humidity raising device according to the present disclosure are discussed below with reference to FIG. 2.

Figure 2:
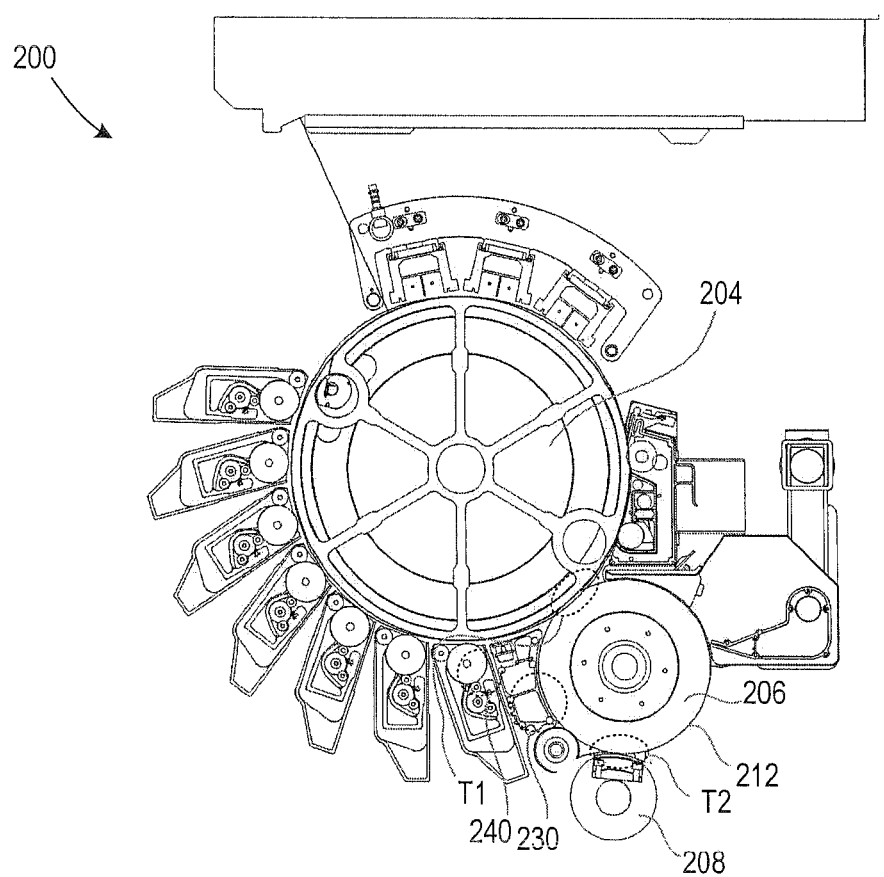
FIG. 2 is a sectional view of an example of a Liquid Electro Photographic (LEP) printing apparatus.

FIG. 2 illustrates a LEP printing system 200, showing the PIP 204, ITM 206, blanket 212 and supporting cylinder 208. The first and second transfer regions T1, T2 can also be seen between the PIP 204 and ITM 206, and between the ITM 206 and the supporting cylinder 208. In accordance with the present disclosure, a humidity raising device may be incorporated within the printing system 200 to raise the relative humidity of the first transfer region T1 above a threshold level, which may be an ambient level of relative humidity, or may be a predetermined threshold level, as discussed in further detail below. The humidity raising device may be located substantially adjacent the ITM 206, at the entrance to the nip of the transfer region T1 in the region indicated 230 in FIG. 2. In one example, the humidity raising device may comprise a humidifier unit in cooperation with a blower or air pump, which may also cooperate with a pipe or other conduit to deliver humid air to the first transfer region T1. The humidifier unit may be capable of producing and emitting microscopic water droplets in high capacity.

In one example, the humidity raising device may be at least partially incorporated within existing features of the printing system 200. In one example, the printing system 200 may be equipped with an exit blanket ventilation (EBV) system that ensures ventilation of the blanket 212. In such a system, a blower or air pump may be used to flow air from the apparatus back to an area post the second transfer region T2. In accordance with the present disclosure, a humidifier unit may be located at a convenient place within the apparatus, for example in a utility cabinet or other suitable area. Components of an upper suction portion of the system may be employed to deliver high humidity air output from the humidifier unit to the first transfer region. An additional conduit, for example in the form of a pipe, may be introduced to the EBV system, to convey the output of the humidifier unit to the first transfer region. The additional conduit and humidifier unit may enable the air pump to draw humid air from the humidifier outlet and deliver it at the entrance to the first transfer area T1. By placing the outlet of the conduit at the entrance to the first transfer area T1, the rotating action of the PIP 204 and ITM 206 may help to entrain the microscopic water droplets of the humid air into the first transfer region T1.

In another example, an output of a humidifier unit may be delivered via a conduit to a region substantially adjacent the PIP, indicated at 240 on FIG. 2. According to this example, the humid air output from the humidifier unit may be directed towards the PIP 204 instead of being directed directly towards the blanket of the ITM 206. The rotating action of the PIP draws the humid air into the nip and the T1 transfer region.

The above examples are merely representative of ways in which a humidity raising device may be incorporated into a printing apparatus to raise the relative humidity of a first transfer region. Other ways may be envisaged in which a humidity raising device may be incorporated in such an apparatus.

Figure 3:
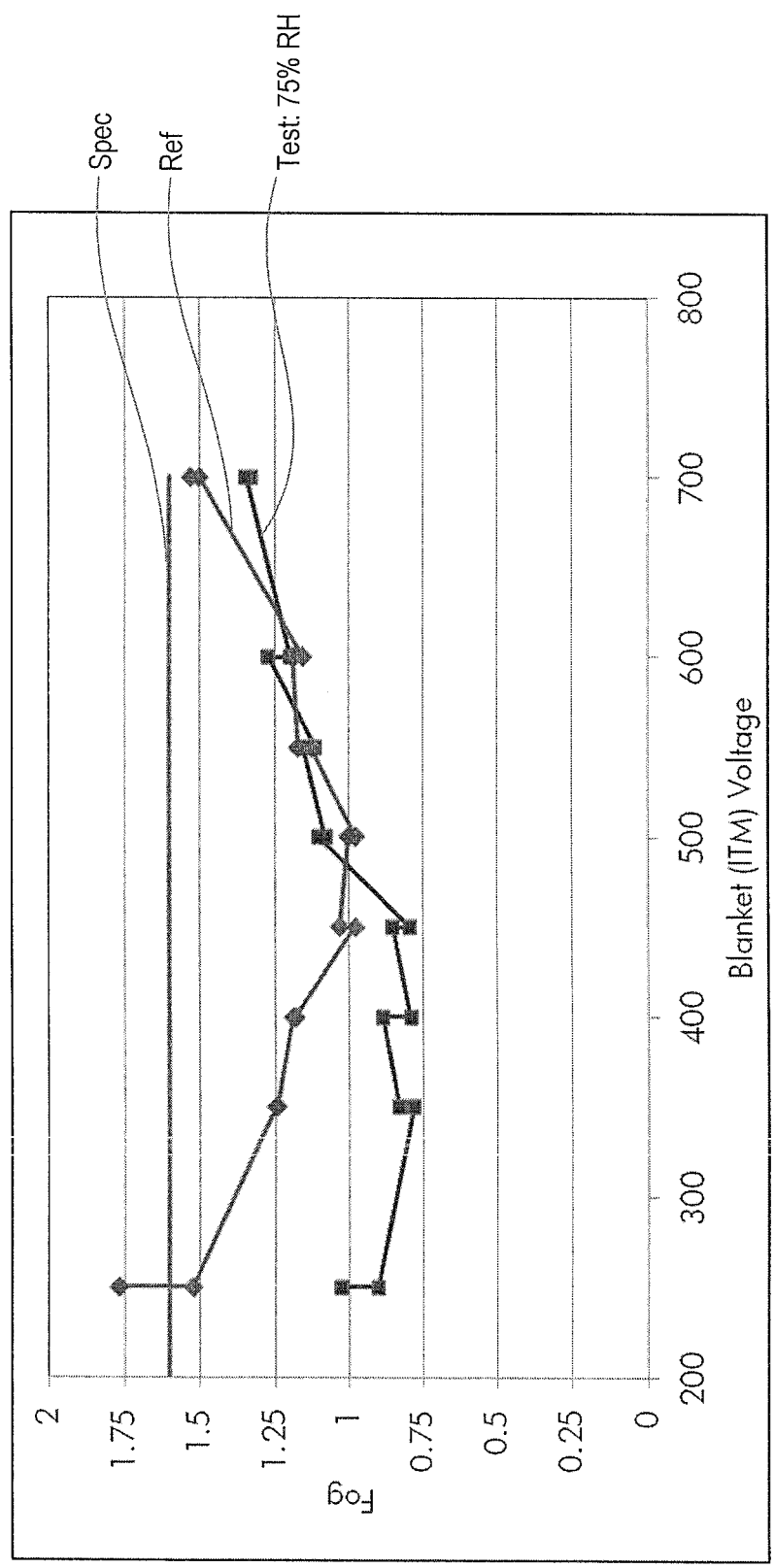
FIGS. 3, 4, 5 and 6 illustrate the results of tests conducted on examples of apparatus as described herein.
Figure 4:
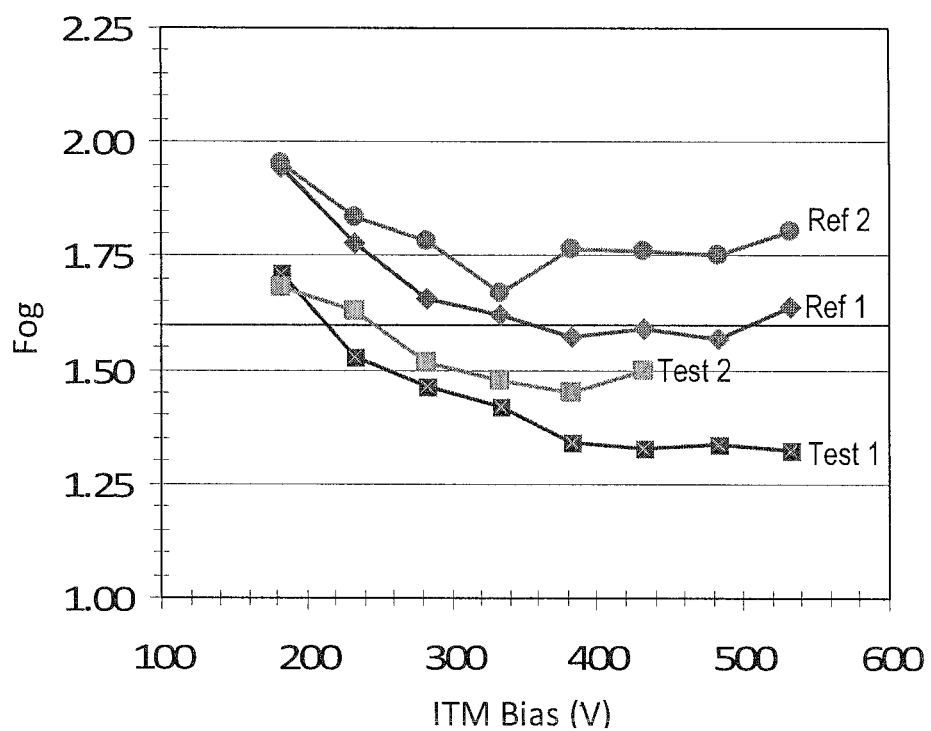

As discussed above, the act of raising the relative humidity of the first transfer region T1 facilitates an ink transfer process from a PIP to an ITM blanket. The positive effects that increased humidity may have on working point values of indentation and ITM bias voltage are discussed below with reference to tests which may be conducted on examples of apparatus according to the present disclosure, and with reference to FIGS. 3 and 4. The graphs shown in FIGS. 3 and 4 illustrate results achieved when testing various examples of apparatus according to the present disclosure. These results are presented merely as examples indicating the trend of results that may be achieved according to various realizations of apparatus according to the present disclosure. The particular parameter values tested, including values of relative humidity, ITM bias voltage and indentation, as well as the specification values indicated in the Figures, are presented here for the purposes of example only, and are not intended to limit in any way the scope of the present disclosure.

In one example, the effect of changing humidity at the first transfer region T1 on final print quality may be tested for images printed as discussed above on an apparatus according to an example of the present disclosure. Print quality may be assessed by measuring the level of Fog in final prints. As discussed above, Fog may be considered as the level of graininess in an image, and according to certain examples, may be defined as the $75^{th}$ percentile of graininess. That is, for a small area of for example 1.0 cm square on a page covered with 100% solid black, the local Fog may be considered as the standard deviation of the measured grey levels in a 255 maximum scale. Considering "n" areas, the Fog may be the $75^{th}$ percentile of the n areas. By measuring the Fog in final prints, the effect on Fog, and hence on print quality, of different values of Relative Humidity (RH) may be assessed during a printing process in which other variables are maintained at a constant level. Individual values of Fog may be recorded together with their standard deviations and a running average calculated, which average may provide an indication of the trend of Fog for increasing RH. During such tests, a value for Fog which may be deemed under certain circumstances to be acceptable may be indicated as a specification value. In some examples, the specification value may be a $75^{th}$ percentile of graininess less than 2.2. The impact of transfer quality at the first transfer region on overall image quality may be appreciated by considering the changing values of Fog (the selected measure of image quality) for different values of RH. Such testing indicates that increasing humidity generally leads to reduced Fog and hence improved image quality.

During a test as described above, the local humidity at the first transfer region may be increased through control of the global humidity of the apparatus. Following completion of such a test, and on considering the results obtained, the range of humidity values considered during the test may be divided into three regimes. A first regime, of humidity below 15%, may not be probed in detail, and an observed trend of results makes clear that Fog values in this regime will be consistently above the specification value of 2.2, indicating a level of print quality which may under certain circumstances be unacceptable. A second regime, of humidity between 15% and 30% may still include a significant proportion of Fog results above the specification value, and hence may also represent levels of image quality which may be deemed unacceptable under certain circumstances. A final regime, of humidity above 30% may be seen to show Fog values well within the specification range of below 2.2. While the results discussed are merely representative of the particular example of apparatus tested, and the conditions maintained during the test, the trend in the results clearly demonstrates that increasing relative humidity leads to reduced image Fog. In this particular example, a threshold value of humidity of 30% is an indicator of acceptable print quality under the conditions and specification tested.

Further testing may be conducted to investigate the effect of increased Relative Humidity on ITM bias voltage. FIG. 3 shows a graph illustrating the effect of relative humidity (RH) on ITM bias voltage for an example apparatus according to the present disclosure. The graph illustrates values of Fog obtained for different ITM bias voltages and plots the results both of a reference series, conducted at ambient relative humidity levels (~30%), and of a test series conducted at a relative humidity of 75% localised to the first transfer region T1. The graph also illustrates a specification maximum Fog value. This specification value is a notional maximum value selected according to the particular test conditions and apparatus concerned. It can be seen from the graph that, under the test conditions of 75% relative humidity, even at low values of ITM bias voltage, Fog values are well within the specified notional maximum value. In contrast, the reference series at ambient humidity includes results that exceed the specified notional maximum value. The particular values illustrated on the graph are indicative of the particular example of apparatus tested, and of the particular example value of relative humidity selected for testing. However, the trend of the results presented illustrates that, particularly at lower values of ITM bias voltage, increased relative humidity significantly reduces Fog of the final printed image when compared to reference prints conducted at ambient humidity with the same bias voltage.

As noted above, in some examples, threshold values for corona breakdown between the PIP and ITM may be of the order of about 450V. In some examples, and in regions of the PIP without charge, threshold values may be of the order of about 300V. The graph of FIG. 3 illustrates one example of an apparatus of the present disclosure that demonstrates increased relative humidity permitting the use of ITM bias values below a possible corona breakdown threshold without requiring compromise in image quality.

Additional examples of such testing are shown in FIG. 4, in which a first reference series and a first test series, and a second reference series and a second test series are presented. The two test series were conducted at increased relative humidity local to the first transfer region. As in the previous case, the particular values illustrated on the graph are indicative of the particular example of apparatus tested, and of the particular example values of relative humidity selected for testing. However, the same trend of results can be seen, indicating that increased humidity enhances image quality and enables the use of lower ITM bias voltages.

Figure 5:
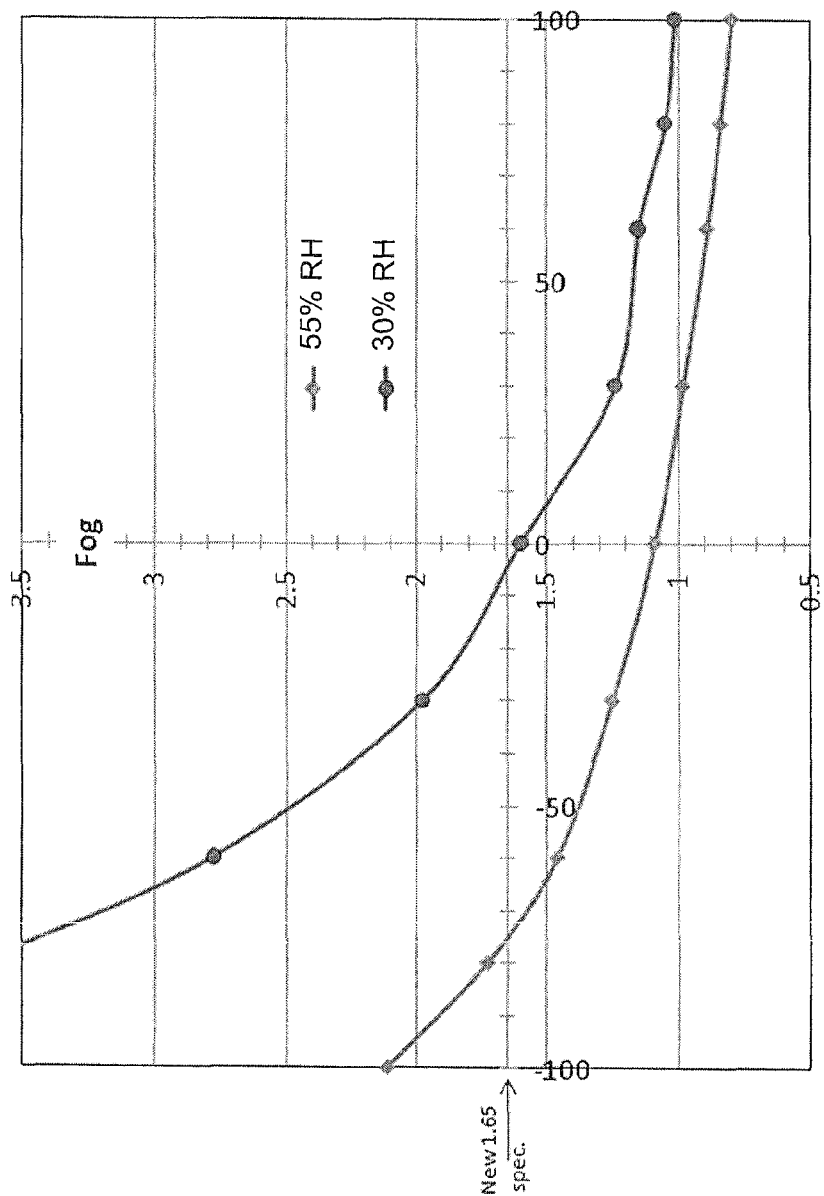

Further testing may investigate the effect of relative humidity on Indentation, which may be measured in µm. FIG. 5 shows a graph presenting results of such a test conducted on an example of an apparatus according to the present disclosure. The results show values of Fog obtained for different indentation values for a first series of prints conducted at 30% RH and a second series of prints conducted at 55% RH, increased humidity at the first transfer region being provided through control of global humidity of the apparatus. A specification value of Fog of 1.65 is also marked on the graph. This specification value is a notional maximum value selected according to the particular test conditions and apparatus concerned. The particular values illustrated on the graph are indicative of the particular example of apparatus tested, and of the particular example value of relative humidity selected for testing. However, it can be seen that for equivalent values of indentation, the greater the relative humidity, the lower the value of Fog. Considered another way, increasing relative humidity permits the use of lower values of indentation to achieve the same level of Fog, and hence the same quality of final print.

Figure 6:
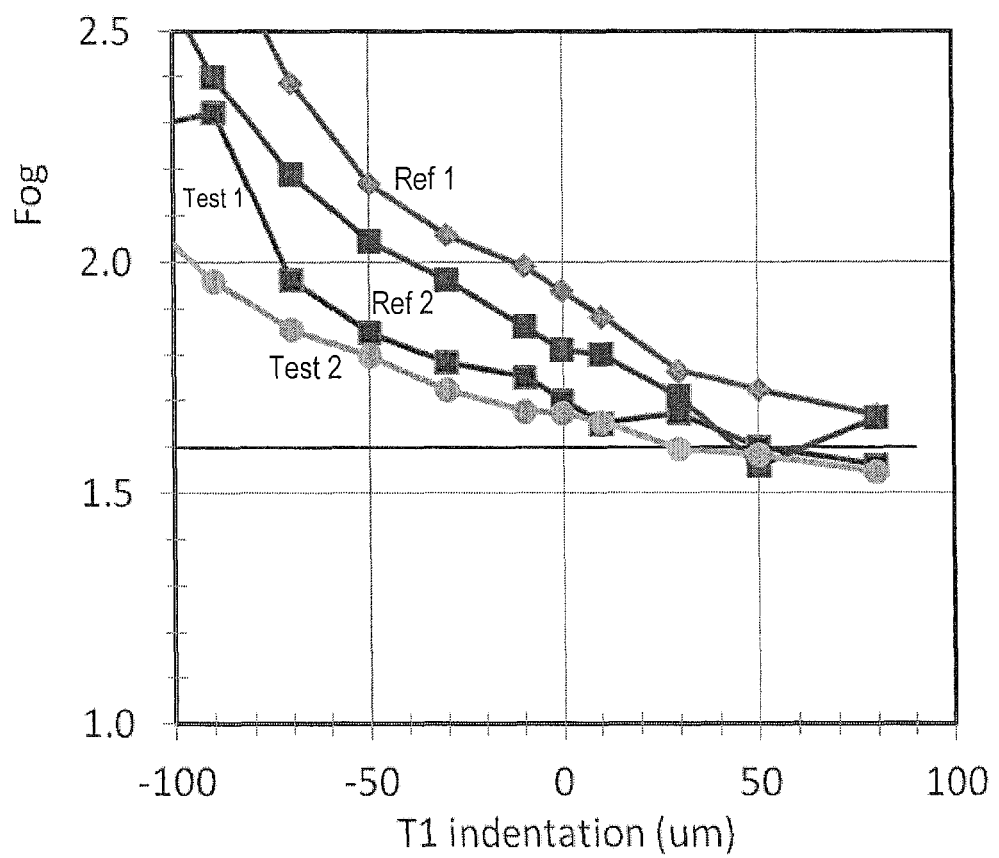

Additional examples of such testing are shown in FIG. 6, in which a first reference series and a first test series, and a second reference series and a second test series are presented. The two test series were conducted at increased relative humidity local to the first transfer region. As in the above cases, the particular values illustrated on the graph are indicative of the particular example of apparatus tested, and of the particular example values of relative humidity selected for testing. However, the same trend of results can be seen, indicating that increased relative humidity allows for the use of lower values of indentation while maintaining the same print quality.

The above discussed testing may be seen to demonstrate the positive effects that increased humidity may have on working point values of indentation and ITM bias voltage. In addition, such testing represents examples of investigation which may be used to establish a threshold value above which the Relative Humidity of the first transfer region may be raised according to certain examples of the present invention. As discussed above, the humidity of the first transfer region may simply be raised above ambient levels, or a particular threshold value may be selected according to the specific parameters and circumstances of an apparatus or printing operation. The above discussed testing is representative of the kind of investigation that may be used to establish such threshold values.

While the apparatus, printer, method and related aspects have been described with reference to certain examples, various modifications, changes, omissions, and substitutions can be made without departing from the spirit of the present disclosure. It is intended, therefore, that the apparatus, printer, method and related aspects be limited only by the scope of the following claims and their equivalents. The features of any dependent claim may be combined with the features of any of the independent claims or other dependent claims.

The invention claimed is:

1. An apparatus comprising:
a transfer member;
a photoconductor to transfer a layer of electrostatic printing material from the photoconductor to the transfer member at a transfer region under the action of a potential difference applied between the transfer member and the photoconductor;
a humidity raising device to raise a relative humidity of air and to output the raised humidity air; and
a conduit having a first end positioned to receive the raised humidity air from the humidity raising device and a second end positioned to deliver the raised humidity air directly to the transfer region.

2. The apparatus of claim 1, wherein the humidity raising device comprises a cooperating air pump and humidifier unit.

3. The apparatus of claim 1, wherein the humidity raising device is to raise the relative humidity of the transfer region above a threshold level of at least 30%.

4. The apparatus of claim 3, wherein the threshold level is at least 50%.

5. A printer for printing on a print media, the printer comprising:
a photoconductor to receive electrostatic printing material according to a latent image formed on the photoconductor;
a transfer member to deliver the electrostatic printing material from the photoconductor to the print media, wherein the photoconductor is to transfer a layer of the electrostatic printing material onto the transfer member at a transfer region of the printer under the action of a potential difference applied between the transfer member and the photoconductor;

a humidity raising device to raise a relative humidity of air and to output the raised humidity air; and a pipe having a first end positioned to receive the raised humidity air from the humidity raising device and a second end positioned to deliver the raised humidity air directly to the transfer region.

6. The printer of claim 5, wherein the humidity raising device comprises a cooperating air pump and humidifier unit.

7. The printer of claim 5, wherein the second end of the pipe is located at an entrance to the transfer region.

8. The printer of claim 5, wherein the humidity raising device is to raise the relative humidity of the transfer region above a threshold level of at least 30%.

9. The printer of claim 8, wherein the threshold level is at least 50%.

10. A method of facilitating transfer of electrostatic printing material from a photoconductor to a transfer member, wherein the transfer is effected at a transfer region under the action of an applied potential difference, the method comprising:

receiving air into a humidity raising device;

increasing a relative humidity of the received air at the humidity raising device to generate raised humidity air; and delivering the raised humidity air to the transfer region via a conduit having an end positioned at an entrance to the transfer region to increase the relative humidity of the transfer region above a threshold value.

11. The method of claim 10, wherein the threshold value is 30% relative humidity.

12. The method of claim 10, wherein the threshold value is 50% relative humidity.

13. The method of claim 10, wherein the threshold value is 75% relative humidity.

14. The method of claim 10, wherein increasing the relative humidity comprises increasing the relative humidity of the received air through operation of an air pump and a humidifier unit.

* * * * *